(12) United States Patent
Ajdenbaum

(10) Patent No.: US 7,642,630 B2
(45) Date of Patent: Jan. 5, 2010

(54) METHOD FOR PRODUCING A REINFORCED DURABLE ELECTRONIC DEVICE, SUCH AS A PLASTIC CARD, AND THE DEVICE OBTAINED THEREFROM

(75) Inventor: Jerome Ajdenbaum, Levallois-Perret (FR)

(73) Assignee: Gemalto, S.A., Meudon (FR)

( * ) Notice: Subject to any disclaimer, the term of this patent is extended or adjusted under 35 U.S.C. 154(b) by 217 days.

(21) Appl. No.: 11/606,233

(22) Filed: Nov. 30, 2006

(65) Prior Publication Data

US 2008/0127488 A1 Jun. 5, 2008

(51) Int. Cl.
*H01L 23/02* (2006.01)
(52) U.S. Cl. .............................. 257/679; 257/E23.064
(58) Field of Classification Search ................ 257/679, 257/E23.064
See application file for complete search history.

(56) References Cited

U.S. PATENT DOCUMENTS 5,020,255 A * 6/1991 Rodel ......................... 40/654
6,049,461 A * 4/2000 Haghiri-Tehrani et al. .. 361/737
7,290,364 B2 * 11/2007 Nelms et al. .................. 40/649

* cited by examiner

*Primary Examiner*—David A Zarneke
*Assistant Examiner*—Jenny L Wagner
(74) *Attorney, Agent, or Firm*—Buchanan, Ingersoll & Rooney PC

(57) ABSTRACT

An electronic device, such as a mini card, has an inlay substrate for the electronic device. The inlay includes a substrate layer, a communication interface having a first metallization supported by the substrate layer, a hole or a hole location area, for attachment to an external device, and a second metallization surrounding at least partially the hole or its location area. The second metallization strengthens the card at the hole area. The method includes realizing the first and second metallizations on the same machine and/or at the same time.

10 Claims, 2 Drawing Sheets

METHOD FOR PRODUCING A REINFORCED DURABLE ELECTRONIC DEVICE, SUCH AS A PLASTIC CARD, AND THE DEVICE OBTAINED THEREFROM

FIELD OF THE INVENTION

The present invention is directed to electronic devices, such as plastic cards that store information pertaining to the respective holders of such cards, including credit cards, identification cards, and the like, and more particularly to plastic cards known as "mini cards" that have a size smaller than the dimensions of a conventional plastic transaction or identification card that conforms to a published standard for such cards. Such an electronic device typically has a hole to attach an external device such as a key ring.

BACKGROUND OF THE INVENTION

Plastic cards containing personalized information have become ubiquitous components of many aspects of modern life. For example, credit cards and debit cards are used to purchase goods and services, identification cards provide their holders with access to restricted areas, and ATM cards enable patrons to conduct monetary transactions with financial institutions. Personal information of the card holder that pertains to the transaction to be performed, e.g. account numbers, identification data, etc., is stored in the card. The storage mechanism can be a magnetic stripe on the card. In the case of a smart card, the information is stored in an electronic memory within a chip embedded into the card, either in lieu of or in addition to a magnetic stripe.

Many cards of these types have a size which conforms to the international standard ISO/IEC 7810. This standard defines a card having a nominal width of about 86 mm, a nominal height of about 54 mm, and a nominal thickness of 0.76 mm. Cards of this size are well known and readily adapted to be carried in a holder's wallet, pocketbook, purse or the like.

Recently, plastic cards having a smaller size than this standard format have become popular. Such cards are sometimes known as "mini cards". Examples of such cards are depicted in U.S. Pat. Nos. 6,471,127 and D467,247. For instance, a mini card might have a width of 66 mm and a height of 40 mm. The card can also have a non-standard shape, as shown, for example, in U.S. Pat. No. D462,966.

One of the advantages of the smaller size of the mini card is that it can be easily carried with other items commonly found on a person, such as a set of keys. For this reason, as illustrated in the previously cited patents, the mini card may be provided with a hole that enables it to be attached to a key ring. Typically, the hole might be located at one corner of the card.

The ability to attach the mini card to other everyday items can result in stresses being placed upon the card that are not typically encountered by standard format cards. For instance, when not in use, a standard card is often carried in a protective environment, such as a wallet or a purse. In contrast, a mini card attached to a key ring is likely to be subjected to much more stress and abrasion. Even the simple acts of hanging the keys on a hook or turning a key in the ignition of a motor vehicle can cause the mini card to be flung against other objects. Of particular significance is the stress that is placed upon the area around the hole that serves as the point of attachment to the keys or other external objects. Over time, the periphery of the hole will be subjected to a significant amount of abrasion. Furthermore, the corner of the card where the hole is located will undergo an appreciable amount of torque stresses, due to normal use.

A conventional plastic transaction card is constructed as a multi-layer structure. A core layer made of Tesling® (a polyolefin-based microporous film) is sandwiched between two PVC printed layers. Transparent PVC overlay layers outside of the printed layers form the exterior surfaces of the card. Although superior to a card made only with PVC layers, this construction still results in a relatively brittle structure that constrains the durability of a mini card. The flexure and torque that is experienced by the mini card can lead to cracking, particularly in the vicinity of the keyhole.

Patent Application Publication No. U.S. 20060011731 describes a card structure that provides increased durability, and therefore greater resistance to failure, than the conventional structure that is employed for standard plastic transaction and identification cards. In accordance with one embodiment of the disclosure, the mini card is comprised of a core made of relatively rigid material, e.g. PVC, which is sandwiched between two layers of durable material, for example a polyester such as PET. These durable layers can also provide the surfaces upon which graphics can be printed. An overlay layer, which might be made of PVC material, can be used to cover each of the two durable layers, to form the exterior surfaces of the mini card. A card having such a construction has been demonstrated to exhibit significantly higher resistance to failure than mini cards having the same structure as conventional standard plastic cards. A card with this construction may nevertheless be too expensive for some applications or countries.

SUMMARY OF THE INVENTION

The present invention is directed, in one aspect, to a card structure with a hole for attachment to an external device that provides increased durability, and therefore greater resistance to failure, than the conventional structure that is employed for standard plastic transaction and identification cards. This durability is obtained with a simple structure for the card and a manufacturing method that is more economical and convenient than previous methods.

In accordance with one embodiment of the invention, the electronic device, such as a mini card, comprises an inlay for the electronic device. The inlay comprises a substrate layer, and a communication interface supported by said substrate layer, said communication interface comprising a first metallization. The inlay further includes a hole or a hole location area, for attachment to an external device, and a second metallization surrounding at least partially the hole or its location area. For economic and mechanical reasons, said first and second metallizations are identical by nature.

The invention is also directed, in another aspect, to a method for producing a plastic card having a reinforced hole through which the card can be attached to an external device. In accordance with one way to carry out the method, said method comprises the step of realizing a second metallization surrounding at least partially the hole or its location area. Advantageously, the method includes also a first metallization on the substrate, and said first and second metallization steps are realized at the same station or at the same time through the same manufacturing means.

Further features of the invention, and the advantages provided thereby, are explained in detail hereinafter, with reference to exemplary embodiments illustrated in the accompanying figures.

DETAILED DESCRIPTION

To facilitate an understanding of the principles upon which the present invention is based, an exemplary embodiment of a mini card having a generally rectangular shape is described hereinafter. It will be appreciated, however, that the shape of the card is not a limiting aspect of the invention. Rather, the principles of the invention are applicable to any type of mini card having dimensions which are smaller than those of a card that conforms to a published standard, such as ISO/IEC 7810, and that is designed to be used in a non-protective environment.

A mini card can be manufactured in much the same manner as a mini SIM card by extracting the mini card from a larger card. A mini card may be connected to a disposable support, or frame. The mini card and the frame together conform to the size of a standard card, having a generally rectangular shape with a nominal width of 86 mm and a nominal height of 54 mm. The mini card is defined by a recess that is cut into one or both of the surfaces of the standard card. These recesses define the profile of the mini card, which in the illustrated example is also of rectangular shape. The mini card might have a nominal width of 66 mm and a nominal height of 40 mm. An attachment hole 3 is located near one corner of the mini card. The hole 3 can have a diameter of about 5 mm, to accommodate a key ring.

Figure 1:
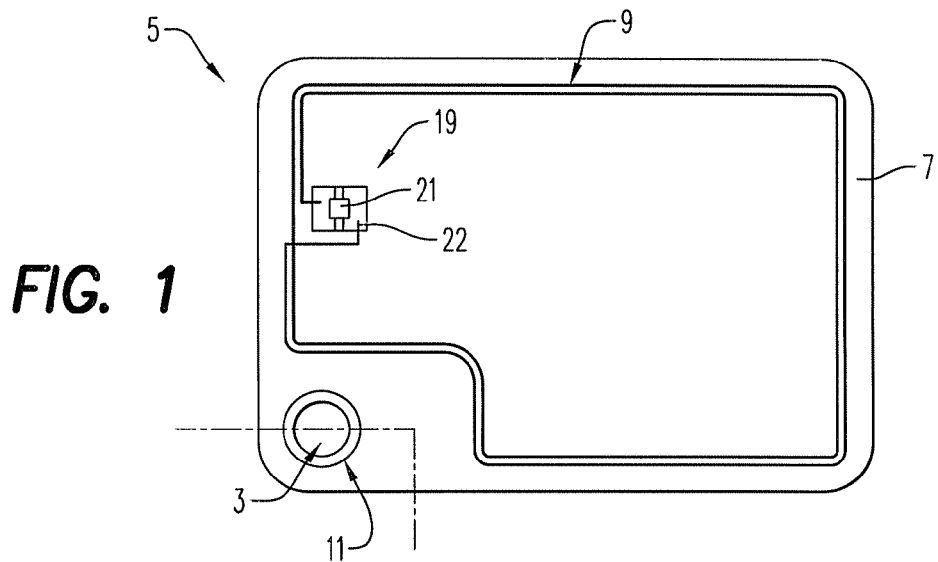
FIG. 1 is a plan view of a contactless card inlay.

As shown in FIG. 1, an inlay substrate 5 for an electronic device according to an embodiment of the invention is an inlay for a smart card; more specifically, the smart card here is a contactless card but the invention is not limited to such a device. The inlay is a sub assembly of the electronic device. In the example, it comprises at least a substrate layer 7 supporting a communication interface 9. The communication interface comprises a first metallization, represented here by a conductive antenna coil 9 having two turns. In another example, the interface may be electric contacts flush with the card surface.

The inlay substrate comprises also a hole 3 or a hole location area 4 (illustrated by dotted lines in FIGS. 2-6) intended to be cut or punched later in order to fit the device with a hole whose function is for example to attach an external device. The inlay may comprise an electronic microcircuit 19 having electrical pads or terminals connected to the first metallization through at least a first connecting point. The integrated chip circuit 21 is in communication relationship with the interface. Here, the chip is connected through first connection point 22 to an antenna terminal.

In order to reinforce the hole, the substrates comprises a second metallization 11 surrounding at least partially the hole location area. In other embodiments or methods, the hole may be made at the inlay stage.

According to an advantageous feature, the first and second metallizations are identical by nature. This means, for example that they are realized by the same method. Therefore, they have, for example, the same aspect, physical and/or chemical properties.

Figure 2:
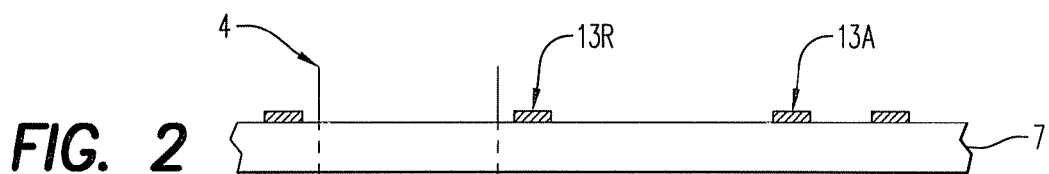
FIGS. 2, 3 and 4 are a partial cross-sectional views of a different embodiments of the metallization realized on the inlay.
Figure 3:
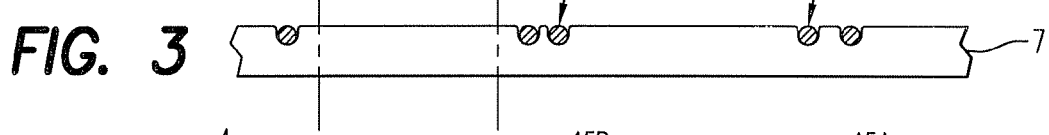
Figure 4:
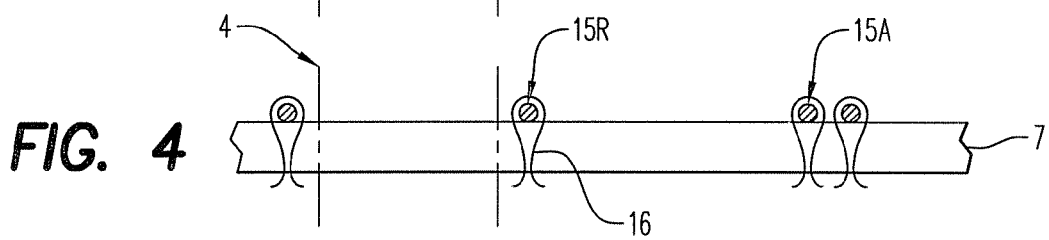

Embodiments illustrating various ways to obtain or select the metallization are shown in FIGS. 2-4. At FIG. 2, the metallizations are electrically conductive tracks 13A, 13R, respectively for the antenna and the ring. The tracks have a rectangular cross section and may be obtained by etching copper for example. At FIG. 3, the metallizations 14A, 14R, respectively for the antenna and the ring, are wire shaped electrical conductive material. The wire may be realized by a wire incrustation method as proposed by Smartrac company, using an ultra-sounds head. At FIG. 4, the metallizations 15A, 15R, respectively for the antenna and the ring, are also wire shaped electrical conductive material. Here the wire may be realized by a seam, an embroidery, a knitted method or any known method for fixing a wire in or on a substrate with the help of another thread 16 crossing the substrate and attaching the wire on it.

In other embodiments (not shown), the metallization may be electrical conductive cord realized by material deposition or punched metal foil.

Figure 5:
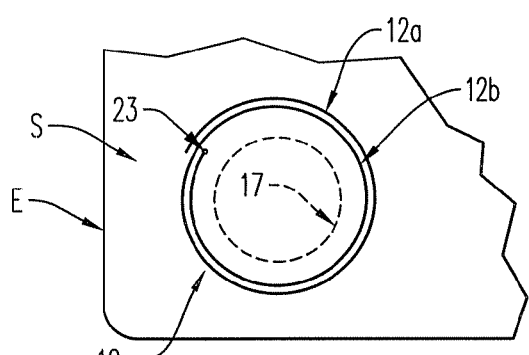
FIG. 5 is a partial view of a first embodiment of the second metallization around a hole area of the substrate.

At FIG. 5, the communication interface is an antenna coil formed by an electrically conductive wire as in FIG. 1, and the second metallization around the hole location area 17 forms a ring 12 of the same wire. The ring comprises two turns 12a, 12b to better reinforce the area where the hole will be located. Preferably, the ring comprises at least one wire turn in order to close the ring. But, it may be sufficient to have the ring not close and the wire or metallization being partly around the hole area. It may, for example, be located only in the narrowest spaces S between the hole area and the edge E of the substrate close to the hole area 17 (defined by the dotted lines).

In the case of a contactless card, the inlay 5 contains both the antenna and an electronic module 19 with an integrated circuit chip 21 having an electronic memory. For a dual interface card having both an antenna and electric surface contacts, also known as a hybrid card or combi-card, the inlay or inlet 5 may only contain the antenna. In this situation, after lamination the card may be milled in the area 19 to a depth that exposes terminals of the antenna. The electronic module is then inserted into the milled hole, to place it in electrical contact with the antenna. Inlays of these types are made, for example, by Smartrac Technology Ltd.

The ring 12 comprises preferably also at least a first connection point 23 between wire portions in order to close it. This feature is particularly useful when there is an electronic microcircuit connected as in FIG. 1. The connecting points 22 and 23 are preferably identical by nature (with the same meaning as above). This feature is advantageous to simplify the manufacturing method. The connection points may be selected from among a welding, e.g. by thermo compression, a joining point made of added conductive material, a seam or embroidery assembly.

Figure 6:
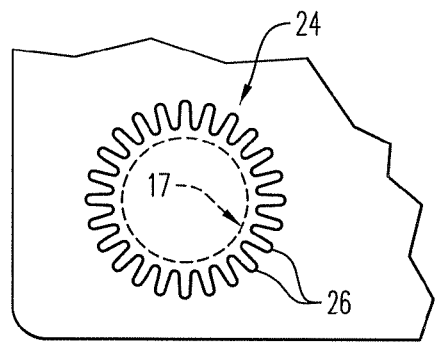
FIG. 6 is a partial view of a second embodiment of the second metallization around a hole area of the substrate.

At FIG. 6, the ring has a different shape. The ring 24 has wire portions 26 respectively perpendicular or in radial position with respect to the hole perimeter 17 or center in order to give better strength to the ring. In the example, the ring contains sinusoidal portions but other shapes may also be suitable.

The inlay, as realized above, is later inserted or joined to another sub assembly to constitute an electronic device such as smart card. In the case of a contactless smart card, the inlay is laminated between two cover layers (not shown) and personalized with personal printing and graphic or security printings or imprinting.

Figure 7:
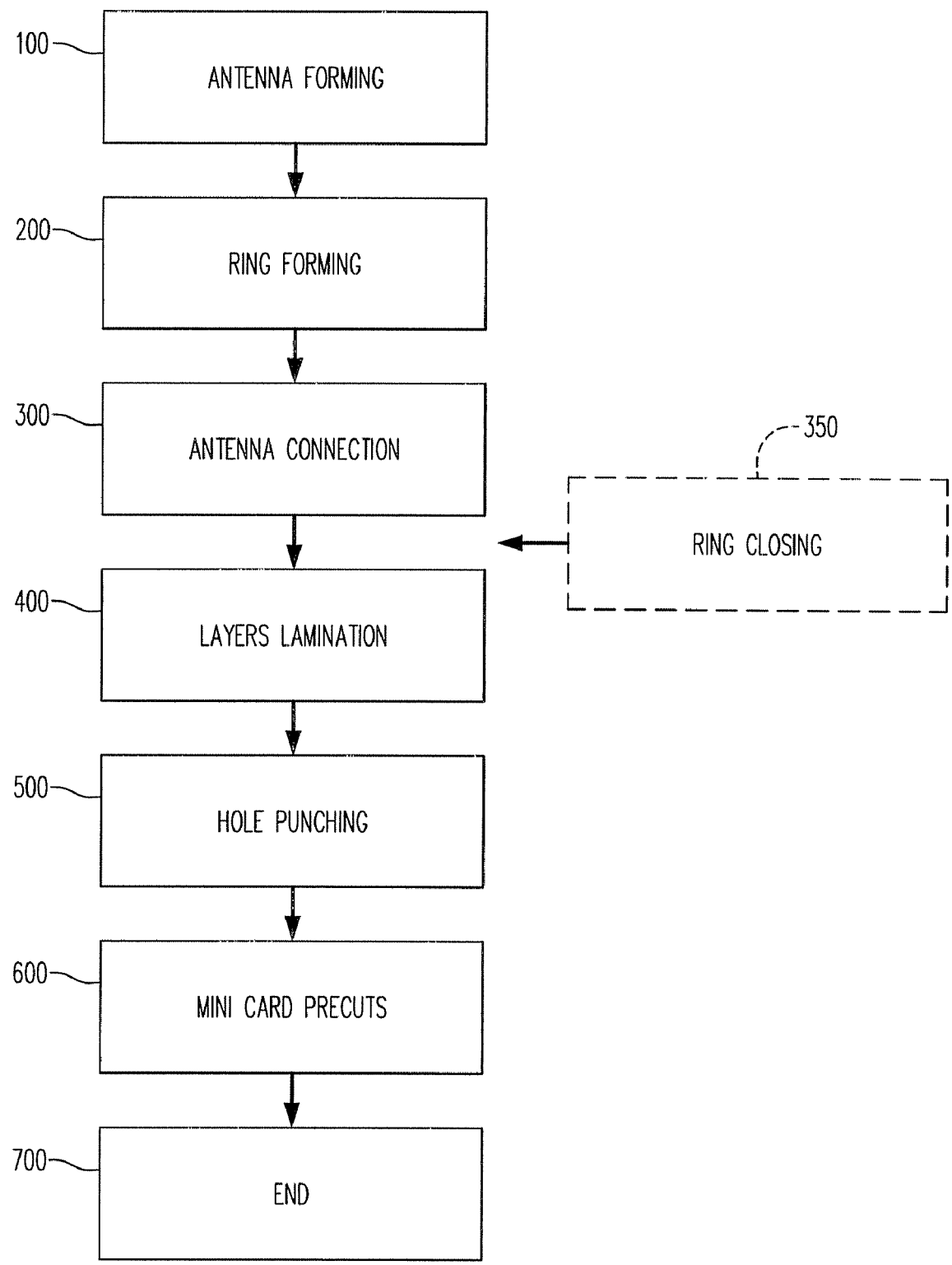
FIG. 7 is a flow chart illustrating a way of carrying out of the invention method.

With reference to FIG. 7, a method is described for producing a plastic card having a reinforced hole through which the card can be attached to an external device. As clearly depicted, the method comprises the step of realizing a second metallization 11, 12, 13R, 14R, 15R, 24 surrounding at least partially the hole 3 or its area location 17.

In relation to a specific preferred way to carry out the method, the method comprises a step 100 where an inlay substrate is realized. It may be realized in order to have one of above described constructions.

It appears clearly that the second metallization acts as reinforcing mean for the hole and is therefore useful as an alternative to laminating a card body with high durable layers which are expensive. The card made by the present method may be realized with low cost material, e.g. Teslin for one or more layers as referenced above.

At step 100, an antenna, as first metallization for a communication interface, is realized with a wire by embroidery on a substrate at a manufacturing post. The substrate is made or includes non woven fibers.

At step 200, a ring as second metallization for strengthening the hole area is made by the same machine or embroidery head. This way to do the metallization step at the same station or at the same time through the same manufacturing means obviously saves time and is very convenient and efficient. The ring here has two turns. The metallization may also be realized by a method selected among the following method of conductive wire encrusting, track etching, electrochemically track depositing, a screen printing, conductive ink or polymer depositing, wire seam. Although it is very convenient and preferred to realize the first and second metallization steps 100, 200 at the same post or at the same time through the same manufacturing means, these steps may be made on different machines or by different methods.

Further, at step 300, an electronic microcircuit having electrical pads or terminals is connected to the first metallization through at least a first connecting point 22. The chip may already be on the substrate or laid on it just before the connection. The microcircuit may comprise only a bare chip or be mounted on a module comprising a substrate and connection surfaces.

Optionally at step 350, at the same time or just after, the end portions of the second metallization are connected together to form a closed ring wherein the connecting points are made at the same connecting station or with the same connecting tool. The connecting points are made with a connecting method such as thermo-compression welding. Other methods such as ultra-sound welding, adhesive conductive material welding, sewing, of embroidering may be used as an alternative method. To achieve that last connection, the end terminal of the wire may cross over a portion of a previous turn of wire. The thermo-compression is realized at the crossing point.

At step 400, the obtained inlay is laminated between at least two overlays, which may include printings and/or protection layers. Subsequently at step 500, the hole is made with a punching tool, along with mini card precuts in an ISO card format at step 600. These precuts enable the mini-card to be removed by the end-user from a larger card body, namely at ISO format. The card may also receive other known graphic personalization before the end of the method at step 700.

The method for producing a plastic card may be also carried out in a simplest way which comprises at least starting by realizing a first metallization 100 for a communication interface on a substrate layer, realizing a second metallization 200 around or over at least partially a location area of a hole, the second metallization being of same type as the first one, laminating 400 the substrate with at least one overlay on at least one substrate layer side covering the second metallization, and finally punching a hole 500 in the area surrounded at least partly by the second metallization through both the substrate and the overlay.

In another embodiment or method implementation, the card body may be obtained by injecting material around or over the inlay in a cavity mold or over-molding a material layer on it, or by extruding material over at least one face. The hole on the cover layer or added material may be realized by injecting or molding the added material on the inlay having the hole already made.

In also another embodiment or method implementation, the second metallization such as an etched metallization is made on the overlay or cover layer, in addition to or in lieu of the one made on the inlay. This gives more freedom to the method in the choice of the ring support, or in case more strength is required in some countries. The lamination with or without the graphic personalization may be done in one country and the inlay in another.

What is claimed is:

1. An inlay substrate for an electronic device, comprising:
   a substrate layer,
   a communication interface supported by said substrate layer, said communication interface comprising a first metallization,
   a hole or a hole location area, for attachment to an external device, and
   a second metallization surrounding at least partially the hole or the hole location area without being disposed within the hole.

2. The inlay substrate of claim 1, wherein said first and second metallizations are made of identical materials.

3. The inlay substrate of claim 1, wherein said second metallization is selected from among a wire shaped electrical conductive material, an electrical conductive track, and an electrically conductive cord.

4. The inlay substrate of claim 1, wherein said communication interface comprises at least an antenna coil formed by an electrically conductive wire, and the second metallization forms a wire ring comprising at least one wire turn.

5. The inlay substrate of claim 4, wherein said ring comprises at least a first connection point between wire portions forming a closed ring.

6. The inlay substrate of claim 5, further comprising:
   an electronic microcircuit having electrical pads or terminals connected to the first metallization through at least a first connecting point,
   at least a second connecting point closing the ring, said first and second connecting points being identical.

7. The inlay substrate of claim 6, wherein said connection point is selected from among a welding, a joining through added conductive material, a seam or embroidery assembly.

8. An inlay substrate for an electronic device, comprising:
   a substrate layer,
   a communication interface supported by said substrate layer, said communication interface comprising a first metallization,
   a hole or a hole location area, for attachment to an external device, and a second metallization surrounding at least partially the hole or the hole location area without being disposed in the hole;

wherein the second metallization is selected from among a wire shaped electrical conductive material, an electrical conductive track and an electrically conductive cord.

9. An inlay substrate for an electronic device, comprising:

a substrate layer, a communication interface supported by said substrate layer, said communication interface comprising a first metallization, a hole or hole location area, for attachment for an external device, and a second metallization surrounding at least partially the hole or the hole location area without being disposed in the hole;

wherein the second metallization is embedded in a portion of the substrate layer distinct from the hole.

10. The inlay substrate of claim 9, wherein the first metallization is embedded in the substrate layer.

* * * * *